United States Patent
Shimonishi et al.

(10) Patent No.: US 9,237,094 B2
(45) Date of Patent: Jan. 12, 2016

(54) COMMUNICATION SYSTEM, CONTROL APPARATUS, PATH CONTROLLING METHOD AND PROGRAM

(75) Inventors: Hideyuki Shimonishi, Tokyo (JP); Takeharu Yasuda, Tokyo (JP); Yuki Tanaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 114 days.

(21) Appl. No.: 13/882,973

(22) PCT Filed: Nov. 2, 2011

(86) PCT No.: PCT/JP2011/075275
§ 371 (c)(1),
(2), (4) Date: May 1, 2013

(87) PCT Pub. No.: WO2012/060403
PCT Pub. Date: May 10, 2012

(65) Prior Publication Data
US 2013/0223452 A1    Aug. 29, 2013

(30) Foreign Application Priority Data
Nov. 2, 2010  (JP) ................................ 2010-246183

(51) Int. Cl.
*H04L 12/28* (2006.01)
*H04L 12/721* (2013.01)
(Continued)

(52) U.S. Cl.
CPC .............. *H04L 45/38* (2013.01); *H04L 49/253* (2013.01); *H04L 49/3009* (2013.01); *H04L 45/66* (2013.01)

(58) Field of Classification Search
None
See application file for complete search history.

(56) References Cited

U.S. PATENT DOCUMENTS 7,519,048 B2 *  4/2009  Kobayashi ................... 370/352
7,593,319 B1 *  9/2009  Sivasankaran et al. ....... 370/216
(Continued)

FOREIGN PATENT DOCUMENTS

JP         2008-301003 A    12/2008
WO     WO2008/095010 A1     8/2008
(Continued)

OTHER PUBLICATIONS

Shimonishi et al., "Building Hierarchial Switch Network Using OpenFlow", 2009 International Conference on Intelligent Networking and Collaborative Systems, IEEE Computer Society, pp. 391-394,                       (http://ieeexplore.ieee.org/stamp/stamp.jsp?arnumber=5369326).*

(Continued)

*Primary Examiner* — Timothy J Weidner
*Assistant Examiner* — Jana Blust
(74) *Attorney, Agent, or Firm* — McGinn IP Law Group, PLLC

(57) ABSTRACT

A communication system includes a plurality of first nodes that, in accordance with processing rules (packet handling operations) prescribing processing contents for a packet belonging to a pre-set flow, processes a packet received, which matches to the processing rules, and a second node that forwards the received packet via its ports without referencing the processing rules. The communication system also includes a control apparatus that sets, for the first nodes situated on a forwarding path for the packet belonging to the pre-set flow, processing rules to forward the packet belonging to the pre-set flow to each next hop. The control apparatus also sets, for the first node not situated on the forwarding path, processing rules to instruct dropping the packet that is forwarded from the second node and that is deviated from the forwarding path.

18 Claims, 13 Drawing Sheets

(51) Int. Cl.
*H04L 12/935* (2013.01)
*H04L 12/937* (2013.01)

(56) References Cited

U.S. PATENT DOCUMENTS

| | | | | |
|---|---|---|---|---|
| 7,746,862 | B1* | 6/2010 | Zuk et al. | 370/392 |
| 7,843,812 | B2* | 11/2010 | Kobatake | 370/222 |
| 2004/0076154 | A1* | 4/2004 | Mizutani et al. | 370/389 |
| 2004/0148374 | A1* | 7/2004 | Bush et al. | 709/223 |
| 2006/0221960 | A1* | 10/2006 | Borgione | 370/390 |
| 2006/0251065 | A1* | 11/2006 | Hamamoto et al. | 370/389 |
| 2007/0091871 | A1* | 4/2007 | Taha | 370/352 |
| 2007/0091890 | A1* | 4/2007 | Radhakrishnan et al. | 370/390 |
| 2008/0037546 | A1* | 2/2008 | Ishikawa et al. | 370/392 |
| 2008/0159137 | A1* | 7/2008 | Konuma et al. | 370/230 |
| 2008/0189769 | A1* | 8/2008 | Casado et al. | 726/4 |
| 2008/0298371 | A1 | 12/2008 | Kobatake | |
| 2011/0261825 | A1* | 10/2011 | Ichino | 370/400 |
| 2011/0271009 | A1* | 11/2011 | Doshi et al. | 709/242 |
| 2012/0230343 | A1* | 9/2012 | Schrum, Jr. | 370/401 |
| 2013/0315248 | A1* | 11/2013 | Morimoto | 370/392 |
| 2014/0064104 | A1* | 3/2014 | Nataraja et al. | 370/248 |
| 2015/0003291 | A1* | 1/2015 | Oikawa | H04L 61/6022 370/254 |

FOREIGN PATENT DOCUMENTS

| | | | | |
|---|---|---|---|---|
| WO | WO 2008/095010 A1 * | 8/2008 | | H04M 7/00 |
| WO | WO2010/103909 A1 | 9/2010 | | |

OTHER PUBLICATIONS

International Search Report in PCT/JP2011/075275 dated Nov. 29, 2011(English Translation Thereof).

Nick McKeown and seven others: "Open Flow: Enabling Innovation in Campus Networks", [online], [retrieved on Oct. 6, 2010 H22, Internet <URL:http://www.openflowswitch.org/documents/openflow-wp-latest.pdf>.

"OpenFlow Switch Specification" Version 1.0.0. (Wire Protocol 0x01), [retrieved on Nov. 22, 2010, Internet <URL: http://www.openflowswitch.org/documents/openflow-spec-v1.0.0.pdf>.

* cited by examiner

FIG. 12

Header Fields; MATCHING RULES

| Ingress Port | Ether SA | Ether DA | Ether type | VLAN ID | VLAN Priority | IP SA | IP DA | IP protocol | IP ToS bits | TCP/UDP src port | TCP/UDP dst port | Counters | Actions |

COMMUNICATION SYSTEM, CONTROL APPARATUS, PATH CONTROLLING METHOD AND PROGRAM

CROSS-REFERENCE TO RELATED APPLICATIONS

This invention claims priority rights pertaining to the JP patent Application 2010-246183 filed in Japan on Nov. 2, 2010. The total contents of this JP Patent Application of the senior filing date are to be incorporated by reference in the present Application.

TECHNICAL FIELD

This invention relates to a communication system, a control apparatus, a path controlling method and a program. More particularly, it relates to a communication system including a node and another node that outputs a received packet at a plurality of ports. It also relates to a control apparatus, a path controlling method and a program. The first-stated node forwards the received packet in accordance with processing rules (packet handling operations) correlating the processing applied to the packet with a set of matching rules that identify a packet to which the processing is applied.

BACKGROUND

A technique termed OpenFlow has been proposed these years, as indicated in Patent Literature 1 and in Non-Patent Literatures 1, 2. The OpenFlow grasps communication as an end-to-end flow and performs routing control, recovery from malfunctions, load balancing and optimization on the flow-by-flow basis. An OpenFlow switch, operating as a relaying device, includes a secure channel for communication with an OpenFlow controller which is comprehended as a control apparatus or controller. The OpenFlow switch is run in operation in accordance with a flow table which is optionally commanded to be amplified or rewritten from the OpenFlow controller. In the flow table, a set of matching rules (header field) to match to a packet header against, flow statistic information (Counters) and an action(s) (Action or Actions) are defined on the flow-by-flow basis. The Action or Actions define processing contents applied to a packet matched to the set of matching rules (header field) (see FIG. 12).

On receipt of a packet, the OpenFlow switch retrieves, from the flow table, such entry having matching rules matched to the header information of the received packet (see the header field of FIG. 12). If, as a result of the retrieval, the entry matched to the received packet is found, the OpenFlow switch updates the flow statistic information (Counter) at the same time as it executes the processing contents as stated in an action field of the entry for the received packet. Examples of the processing contents include packet forwarding from a specified port, packet flooding and packet dropping. If, as a result of the retrieval, no entry matched to the received packet is found, the OpenFlow switch forwards the received packet to the OpenFlow controller over a secure channel to request the OpenFlow controller to decide on a path of the packet based on the source and destination of transmission of the received packet. The OpenFlow switch receives a flow entry which will comply with the request to update the flow table. The OpenFlow switch thus forwards the packet using the entry stored in the flow table as the processing rules.

Patent Literature 2 shows a relaying device including a port move detection circuit that detects port move produced when a frame has arrived from a path learned in a MAC address table.

CITATIONS LIST

Patent Literatures (PTL)

PTL 1: International Publication No. 2008/095010
PTL 2: JP Patent Kokai JP-P2008-301003A Non-Patent Literatures (NPL)

NPL 1: Nick McKeown and seven others: "OpenFlow: Enabling Innovation in Campus Networks", [online], [retrieved on October 6, H22 (2010), Internet <URL: http://www.openflowswitch.org/documents/openflow-wp-latest.pdf>
NPL 2: "OpenFlow Switch Specification" Version 1.0.0. (Wire Protocol 0x01), [retrieved on November 22 (2010), Internet <URL: http://www.openflowswitch.org/documents/openflow-spec-v1.0.0.pdf>

SUMMARY

The disclosures of the above mentioned Patent and Non-Patent Literatures are incorporated herein by reference. The following analysis is by the present invention.

It is highly probable that a legacy switch that outputs a received packet via a plurality of ports to carry out packet forwarding should exist in a network represented by an OpenFlow shown in the Patent Literature 1 and the Non-Patent Literatures 1, 2. For example, if there exists in the network a repeater hub, or a switching hub has performed flooding, the packet is forwarded via a plurality of ports with such switch as a starting point (see the HUB of FIG. 13). There is thus presented a problem that a packet will flow on a path not intended by a user. Likewise, when a multicast/broadcast frame is allowed to flow, packets will flow on unintended paths.

For example, suppose that there is set a packet forwarding path which forwards a packet from an OpenFlow switch, abbreviated to 'OFS' 1, a legacy switch ('HUB' in the drawing), an OFS2 and an OFS3, in this order, as shown in FIG. 13, and the HUB halfway on the path forwards the packet from its multiple ports. In such case, the packet is forwarded to an OFS4 as well. It is observed that, depending on the contents of the processing rules, as set on the OSF4, the packet may be forwarded to some different node or returned to the HUB side. Or, a new flow detection notification message (Packet-In), that is, a request for setting processing rules, may be sent to a controller 900.

It is an object of the present invention to provide a configuration and a method in which, even in an environment where there co-exist a first node typified by an OpenFlow switch shown in Patent Literature 1 and in Non-Patent Literatures 1 and 2, and a second node typified by the above mentioned legacy switch, it is possible to suppress a situation in which packets whose paths are to be controlled are forwarded off their intended paths one after another.

A communication system according to a first aspect of the present invention includes a plurality of first nodes that, in accordance with processing rules (packet handling operations) prescribing processing contents for a packet belonging to a pre-set flow, process a packet that is received and that matches to the processing rules. The communication system also includes a second node that forwards the received packet via a plurality of ports thereof under pre-set conditions. The communication system also includes a control apparatus that sets, for the first nodes situated on a forwarding path for the packet belonging to the pre-set flow, processing rules to forward the packet belonging to the pre-set flow to each next hop. The control apparatus also sets, for the first node not situated on the forwarding path, processing rules to command dropping the packet that is forwarded from the second node and that has become deviated from the forwarding path.

A control apparatus according to a second aspect is connected to a plurality of first nodes that, in accordance with processing rules (packet handling operations) prescribing processing contents for a packet belonging to a pre-set flow, process a packet that is received and that matches to the processing rules, and to a second node that forwards the received packet via a plurality of ports thereof under pre-set conditions. For the first nodes situated on a path of forwarding a packet belonging to the pre-set flow, the control apparatus sets processing rules to forward the packet belonging to the pre-set flow to each next hop. For the first node not situated on the forwarding path, the control apparatus sets processing rules to drop the packet that is forwarded from the second node and that has become deviated from the forwarding path.

A path control method according to a third aspect is configured to be carried out by a control apparatus connected to a plurality of first nodes that, in accordance with processing rules (packet handling operations) prescribing processing contents for a packet belonging to a pre-set flow, process a packet that is received and that matches to the processing rules, and to a second node that forwards the received packet via a plurality of ports thereof under pre-set conditions. The method includes the steps of setting, for the first nodes situated on a path of forwarding the packet belonging to the pre-set flow, processing rules that implement a forwarding path, and setting, for the first node not situated on the path of forwarding the packet, processing rules that instruct dropping the packet that is off the forwarding path and that has been forwarded from the second node. It is observed that the present invention is bound up with a particular machine which is a computer making up the control apparatus controlling the first nodes.

A program according to a fourth aspect is executed by a computer making up a control apparatus connected to a plurality of first nodes that, in accordance with processing rules prescribing processing contents for a packet belonging to a pre-set flow, process a packet received which matches to the processing rules, and to a second node that forwards the received packet via a plurality of ports thereof under pre-set conditions. The program allows execution of the processing of setting, for the first nodes situated on a path of forwarding the packet belonging to the pre-set flow, processing rules that implement the forwarding path, and the processing of setting, for the first node not situated on the path of forwarding the packet belonging to the pre-set flow, processing rules that instruct dropping the packet that is off the forwarding path and that has been forwarded from the second node. It is observed that the program may be recorded on a computer-readable recording medium. That is, the present invention may be implemented as a computer program product.

The meritorious effects of the present invention are summarized as follows.

According to the present disclosure, it is possible to suppress a situation in which packets, a path for which is to be controlled, are off their intended path and forwarded in this state one after another.

BRIEF DESCRIPTION OF DRAWINGS

FIG. 12 is a tabulated diagram showing the configuration of a flow entry shown in Non-Patent Literature 2.

PREFERRED MODES

Figure 1:
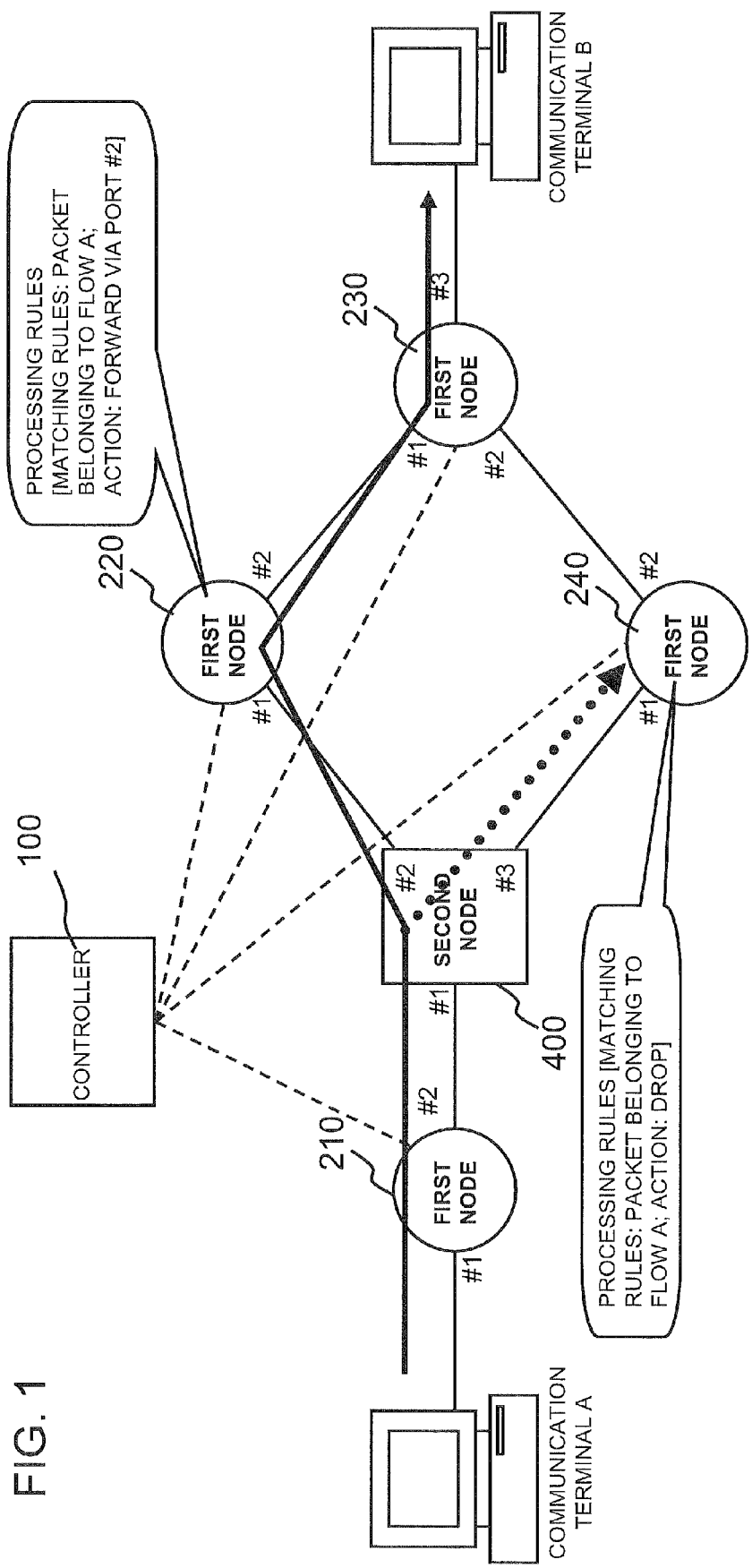
FIG. 1 is a schematic view for illustrating the gist of the present invention.

Initially, the gist of an exemplary embodiment of the present invention will be explained. In the exemplary embodiment of the present invention, a communication system is provided which includes first nodes 210 to 240, a second node 400 and a controller 100, as shown in FIG. 1, in which communication terminal A communicates with communication terminal B via the communication paths passing through the first nodes 210-240 and the second node 400, as shown in the solid lines in FIG. 1. Using a set of processing rules, prescribing the contents of processing for a packet belonging to a pre-set flow, the first nodes process a received packet matched to the processing rules. The second node forwards the received packet via its multiple ports without referencing the processing rules, that is, not under control by the controller. The controller exercises path control (as shown in the dashed lines in FIG. 1) by setting, for the first nodes situated on a forwarding path (as shown in the bold line in FIG. 1) for the packet belonging to the pre-set flow, such as nodes 210, 220 and 230 of FIG. 1, processing rules to forward the packet belonging to the pre-set flow to each next hop. In the configuration of the communication system according to the present invention, the controller sets, for the first node 240 not situated on the forwarding path, processing rules instructing dropping of the packet that has been forwarded from the second node 400 and that is off the forwarding path (as shown in the dotted line in FIG. 1). It is observed that symbols for referencing the drawings, used in the gist, are entered for respective elements only as examples to assist in the understanding and are not intended to restrict the invention to the mode shown in the drawings.

In the first node 240, not situated on the packet forwarding path, there are set processing rules instructing that the packet that are off the packet forwarding path is to be dropped, as described above. This suppresses that any superfluous packet, forwarded from the second node 400, is forwarded to an unintended node, or that a request to set processing rules for such packet, that is, a new flow detection notification message (Packet-In), is sent to the controller.

The first node in which to set the processing rules to drop the packet deviated from the packet forwarding path may optionally be selected from among the first nodes situated downstream of the second node 400. However, from the perspective of reducing the number of unneeded traffic to as small a value as possible, the processing rules to instruct dropping the packet deviated from the forwarding path are preferably set in the first node 240 that directly receives packets from the second node 400, as shown in FIG. 1.

In the example shown in FIG. 1, there are three ports in the second node, and the processing rules, instructing the dropping of the packets deviated from the forwarding path, are set in the first node 240 coupled to one of two ports of the second node outputting the packet. In case the second node has four or more ports, the processing rules to instruct packet dropping may similarly be set in the first node that is off the forwarding path.

Exemplary Embodiment 1

Figure 2:
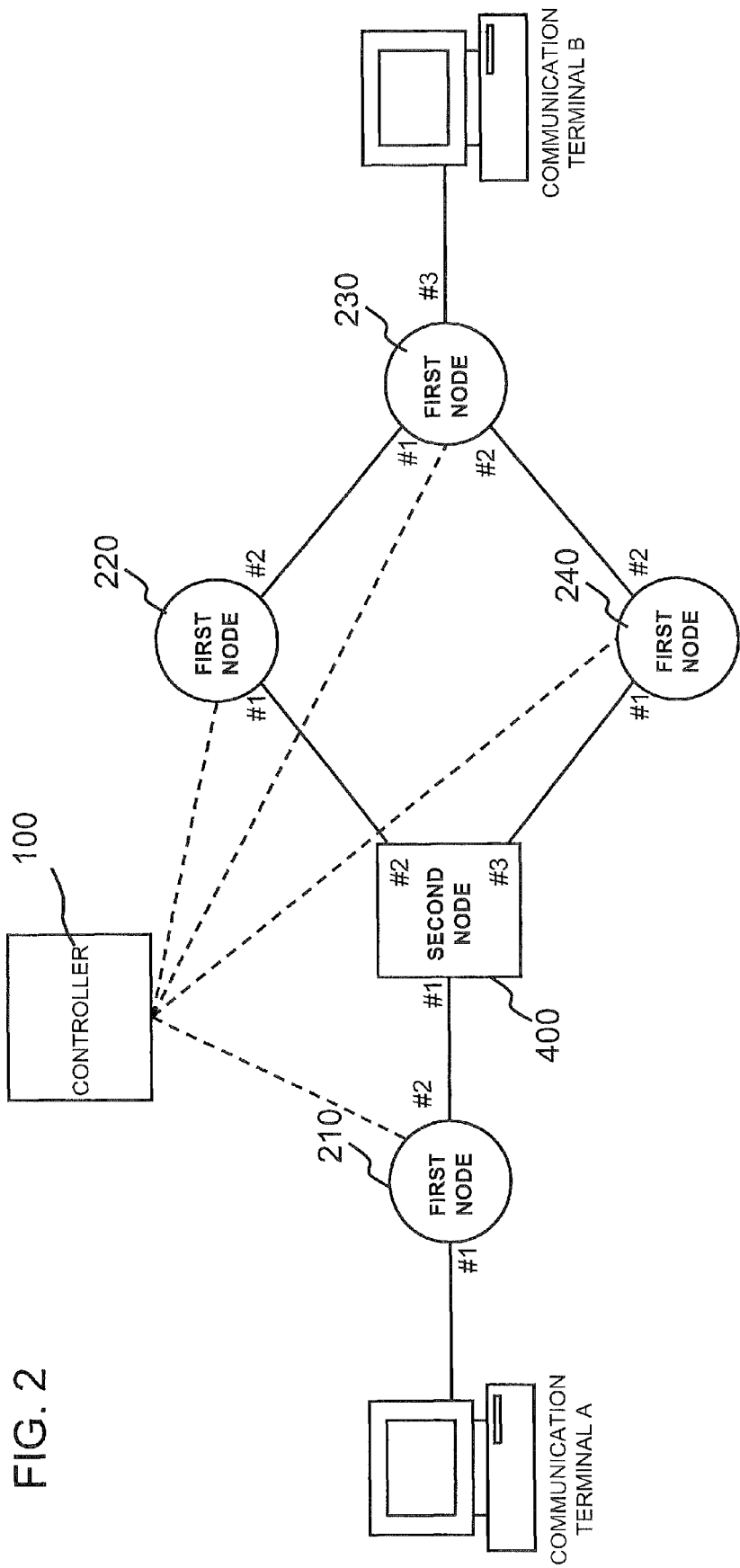
FIG. 2 is a schematic view showing the configuration of a communication system according to an exemplary embodiment 1 of the present invention.

An exemplary embodiment 1 of the present invention will now be described in detail with reference to the drawings. FIG. 2 depicts a schematic view showing a configuration of an exemplary embodiment 1 of the present invention. Referring to FIG. 2, the configuration includes a first node 210, a communication terminal A is connected to, and a first node 230, a communication terminal B is connected to. The configuration also includes a second node 400 that forwards the received packet via its multiple ports, and first nodes 220, 240 interconnecting the first node 230 and the second node 400. It is observed that reference symbols entered in the vicinity of links interconnecting the first nodes 210 to 240 and the second node 400, such as #1 and #2, denote port numbers of the respective nodes.

Each of the first nodes 210 to 240 is a switch including a packet processor that processes a received packet in accordance with the processing rules that correlate the processing applied to a packet with the matching rules that specify the packet the processing is applied to. For example, each of the first nodes may be a switch that is able to operate as an OpenFlow switch of Non-Patent Literature 2.

The second node 400 may, for example, be a repeater hub that outputs a received packet via the total of ports except the port that received the packet, or a Layer 2 switch that outputs a received packet via multiple ports during flooding similarly to the repeater hub. In the explanation to follow, it is assumed that the second node 400 forwards the packet, received from a given port, such as port #1, via a port(s) other than the port where the packet has been received, such as #2 or #3.

A controller 100 is such a device that sets processing rules in the first nodes, out of the first nodes 210 to 240, situated on a separately calculated packet forwarding path. The processing rules implement packet forwarding along the packet forwarding path. In the following explanation of the outstanding exemplary embodiment, it is assumed that the controller 100 is an OpenFlow controller of Non-Patent Literature 2 capable of setting processing rules (flow entries) in the first nodes 210 to 240 via a secure channel indicated by broken lines in FIG. 2, sending a buffered packet or collecting the statistic information (Counters).

In the following explanation of the exemplary embodiments, it is assumed that the MAC address of the communication terminal A is 'A' and that of the communication terminal B is 'B'.

Figure 3:
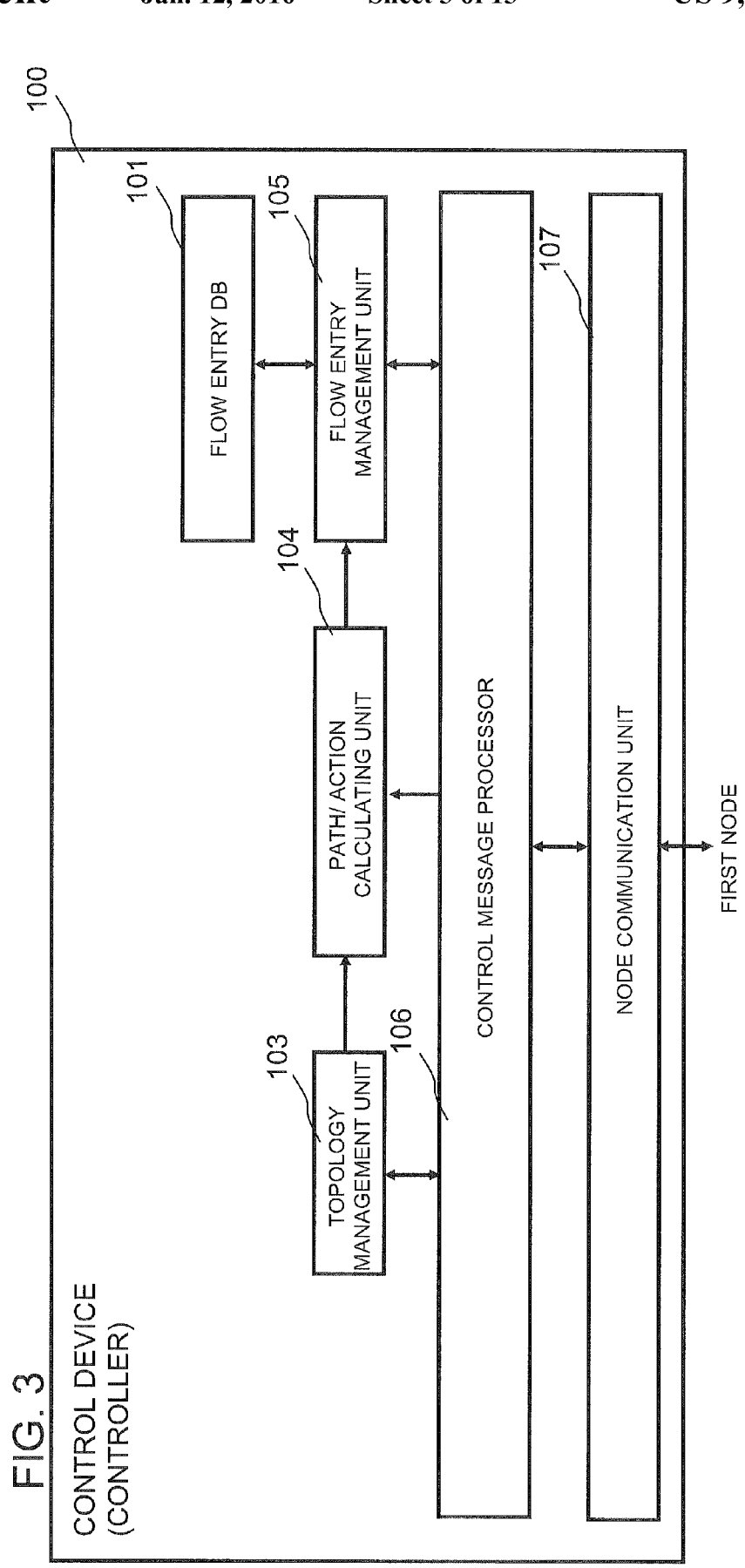
FIG. 3 is a block diagram for illustrating the configuration of the controller according to the exemplary embodiment 1 of the present invention.

FIG. 3 depicts a block diagram showing the configuration of a control apparatus (controller) 100 operating as an OpenFlow controller. Referring to FIG. 3, the control apparatus (controller) 100 is composed by a flow entry database (flow entry DB) 101, a topology management unit 103, a path/action calculating unit 104, a flow entry management unit 105, a control message processor 106 and a node communication unit 107. The flow entry DB 101 stores processing rules (flow entries) made up of matching rules (matching rules), shown as an example in FIG. 12, an action(s), inclusive of a timer value(s), and the flow statistic information, and the node communication unit 107 communicates with the first nodes 210 to 240. The operation of these components of the controller is as follows:

The topology management unit 103 constructs and manages the network topology information, based on the relationship of interconnection of the first nodes 210 to 240 as collected by the node communication unit 107.

Based on the network topology information, constructed by the topology management unit 103, the path/action calculating unit 104 finds the packet forwarding path, an action(s) to be executed by the first nodes on the forwarding path and a timer value(s) as the term of validity of the processing rules. The path/action calculating unit 104 allows the flow entry management unit 105 to prepare the processing rules including an action to have the first node other than those on the packet forwarding path drop the packets, and a proper timer value(s).

Based on the information received from the first nodes 210 to 240, the flow entry management unit 105 prepares matching rules (matching key), while registering the results calculated by the path/action calculating unit 104 in the flow entry DB 101 as the processing rules (flow entries) and setting the processing rules (flow entries) in response to a request to amplify or update the processing rules (flow entries) from the first nodes 210 to 240. Moreover, based on a command from the path/action calculating unit 104, the flow entry management unit 105 prepares and sets, in the first node other than those on the packet forwarding path, processing rules including an action(s) to drop a packet as well as proper timer value(s).

The control message processor 106 analyzes a control message received from the first nodes 210 to 240 to deliver the control message information to relevant processing means in the control apparatus (controller) 100. For example, if a new flow detection notification message (Packet-In) is received from the first nodes 210 to 240, the control message processor 106 inquires at the flow entry management unit 105 whether or not the processing rules (flow entries) to be applied to the new flow of interest are already registered in the flow entry DB 101. If the processing rules (flow entries) are not registered, the control message processor 106 asks the path/action calculating unit 104 to prepare new processing rules (flow entries).

The respective components (processing means) of the control apparatus (controller) 100, shown in FIG. 3, may be implemented by a computer program that allows a computer that makes up the control apparatus (controller) 100 to execute the above mentioned processing using the computer hardware.

Figure 4:
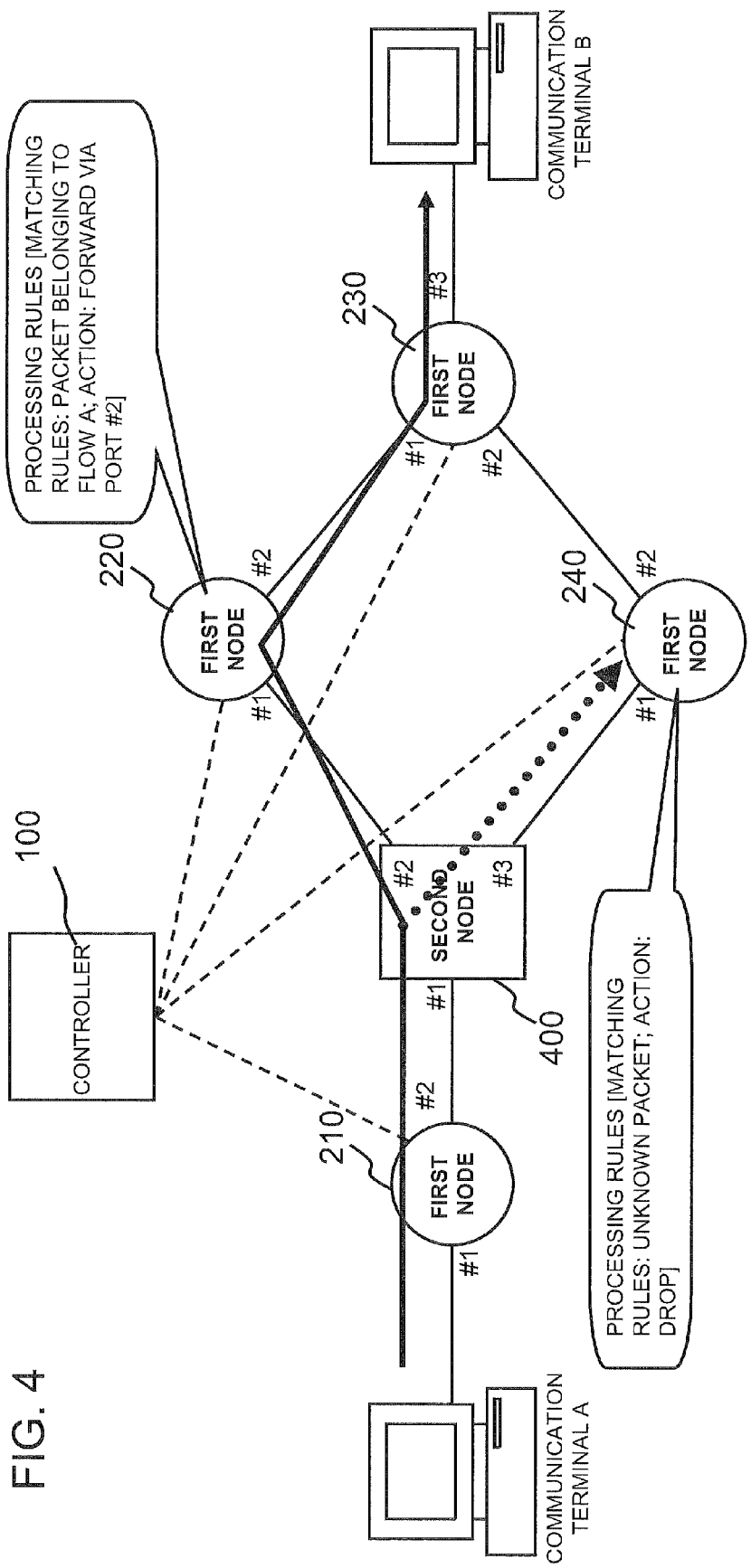
FIG. 4 is a schematic view for illustrating the operation of the exemplary embodiment 1 of the present invention.

The operation of the subject exemplary embodiment will now be explained in detail with reference to the drawings. FIG. 4 depicts a schematic view illustrating the operation of the exemplary embodiment of the present invention. In a legend of FIG. 4, there are shown processing rules as set in the first node of interest. For example, the processing rules in a legend of the first node 220 of FIG. 4 which read: [matching rules: packet belonging to a flow A; action: forward via port #2] indicate that, in case of reception of a packet belonging to the flow A, in the course of collation to the matching rules, the packet is to be output via port #2.

In the explanation to follow, it is presupposed that, as indicated by a thick solid line in FIG. 4, the path/action calculating unit 104 has conducted calculations by the path/action calculating unit 104 of the control apparatus (controller) 100 for a packet flow 'flow A' addressed from the communication terminal A to the communication terminal B. It is also presupposed that, as a result of the calculations by the path/action calculating unit 104, a packet forwarding path has been found which forwards the packet from the first node 210, thence to the first node 400, thence to the first node 220 and thence to the first node 230.

If the packet addressed from the communication terminal A to the communication terminal B is output via the port #2 of the first node 210, the second node 400 outputs the packet, received via its port #1, at its ports #2 and #3. In the subject exemplary embodiment, the control apparatus (controller) 100 sets processing rules performing an action that, should the first node 240 have received a packet not conforming to the processing rules applied to the specified flow as set by the control apparatus (controller) 100, viz., an unknown packet not belonging to any of flows, the packet is to be dropped.

This renders it possible to suppress a situation in which the first node 240 forwards the packet it has received to a non-pertinent node(s).

In connection with the example of FIG. 4, it is stated above that the processing rules are to be set in the first node 240 so that, in case the first node has received a packet not belonging to any flows as set by the control apparatus (controller) 100, the packet in question is to be dropped. The processing rules may also be set to the effect that, if the packet belonging to the flow A is received, as shown in FIG. 1, the packet received is to be dropped.

Exemplary Embodiment 2

An exemplary embodiment 2 of the present invention will now be described in detail with reference to the drawings. In the exemplary embodiment 1, described above, control is exercised so that the first node other than those situated on the packet forwarding path will drop an unknown packet not belonging to any flows.

Figure 5:
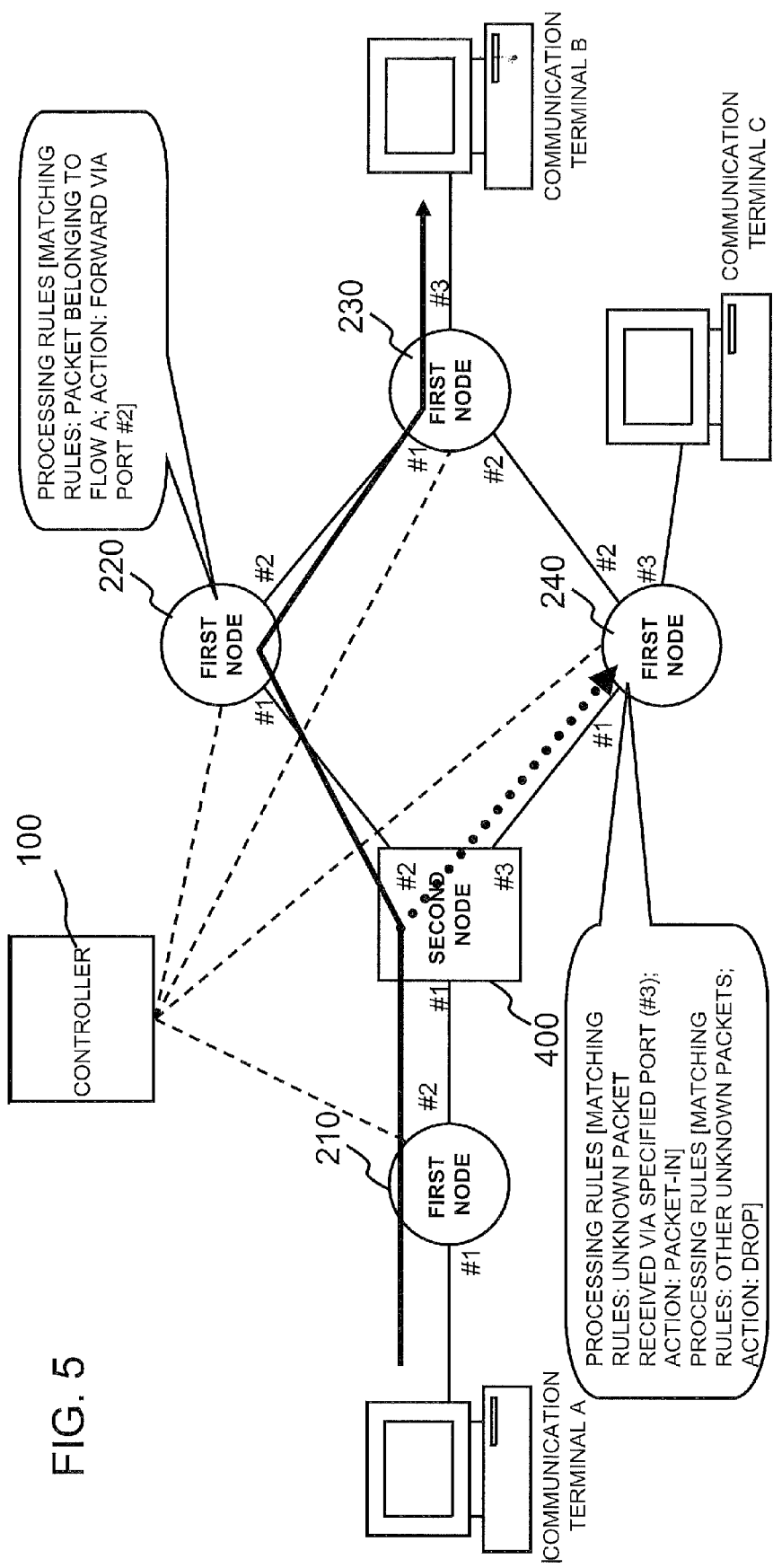
FIG. 5 is a schematic view for illustrating the operation of an exemplary embodiment 2 of the present invention.

However, if a further communication terminal is connected to the first node (see a communication terminal shown in FIG. 5), and a new communication flow from such communication terminal is also dropped, path control would be unable to be managed (see the communication terminal C of FIG. 5).

The exemplary embodiment 2, configured to avoid such inconvenience, will now be explained. It is observed that the exemplary embodiments 2 to 5, explained subsequently, may be implemented by the configuration similar to the above described exemplary embodiment 1. Thus, in the following explanation, the points of difference from the exemplary embodiment 1, in particular the processing rules set in the first nodes, will be set out in detail.

FIG. 5 shows the operation of the subject exemplary embodiment 2 of the present invention. A main point of difference from the exemplary embodiment 1 is that the communication terminal C is coupled to a port #3 of the first node 240. As in the exemplary embodiment 1, it is again presupposed that, for a packet addressed from the communication terminal A to the communication terminal B, a packet forwarding path has already been found such that a packet is forwarded from the first node 210, thence to the second node 400, thence to the first node 220 and thence to the first node 230.

The controller 100 of the subject exemplary embodiment sets, in the first node 240 deviated from the packet forwarding path, not only the processing rules to drop the unknown packet, but also the processing rules that cause the node to request the controller 100 to set processing rules (viz., to send out to the controller a new flow detection notification message or Packet-In) for a packet received via specified port (port #3). The second stated processing rules are of the order of priority higher than that of the first stated processing rules. See a legend for the first node 240 of FIG. 5. The rank of priority between the first and second stated processing rules may be indicated by a value of an entry in a specified field included in the processing rules, or simply by the sequence among the processing rules which is stored in, as an example, a table form.

Figure 6:
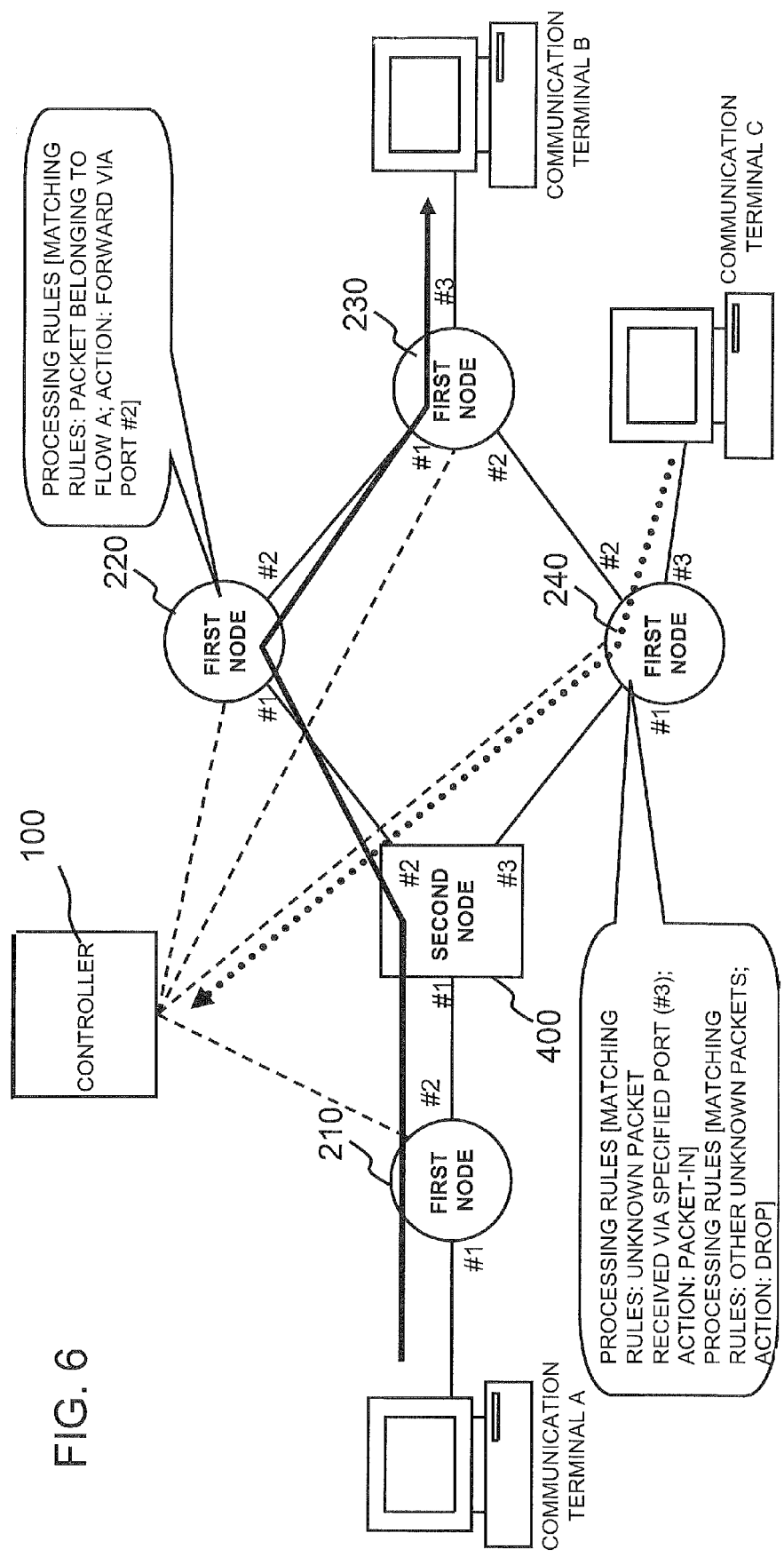
FIG. 6 is a schematic view for illustrating the operation of the exemplary embodiment 2 of the present invention.

It is thus possible to have the first node 240 ask the controller 100 to exercise path control for a packet received from the communication terminal C as well as to cause unknown packets other than the packet received from the communication terminal C to be dropped, as shown in FIG. 6.

Exemplary Embodiment 3

An exemplary embodiment 3 of the present invention will now be described in detail with reference to the drawings. In the above described exemplary embodiment 2, it is known from the outset that the communication terminal C is connected to the specified port of the first node 240. Hence, the processing rules are set in which the port has been specified. However, such a case may arise in which the processing rules may not be set as the position of the communication terminal is included in the matching rules, such as when the communication terminal C is mobile.

Figure 7:
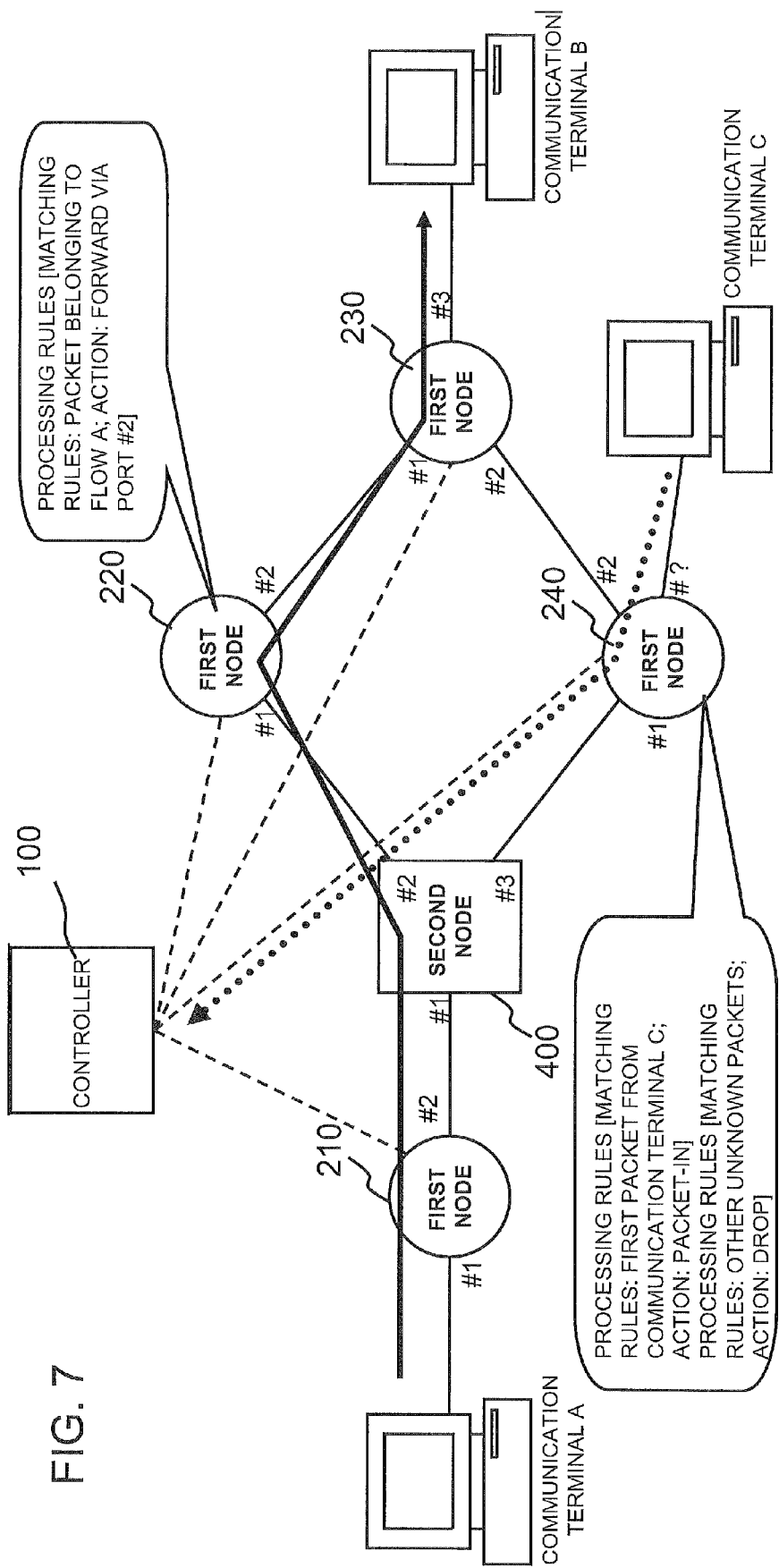
FIG. 7 is a schematic view for illustrating the operation of an exemplary embodiment 3 of the present invention.

Thus, in the subject exemplary embodiment, not the port of the first node 240 is identified and, as shown in FIG. 7, a set of matching rules, devoted to packets from the communication terminal C, is prepared. A set of processing rules which will cause the node to request the controller 100 to set devoted processing rules for such packets, viz., send a new flow detection notification message or Packet-In to the controller 100, is set.

As regards the timing to set the processing rules, reception from the communication terminal C of an authentication requesting packet in an authentication server, not shown, or a position registration requesting packet in a position registration requesting server, also not shown, may be used as incentive. As regards the first node in which to set the above mentioned processing rules, it is sufficient that reference is made to the network topology to select the first node in the vicinity of the communication terminal C.

Thus, even if the position of the communication terminal is not known, a first node situated in the vicinity of the communication terminal may request the controller to set devoted processing rules for packets received from the communication terminal, that is, may send to the controller a new flow detection notification message (Packet-In), and may also cause the other unknown packet(s) to be dropped, with the reception of an authentication requesting packet or an position registration requesting packet as an incentive.

Figure 8:
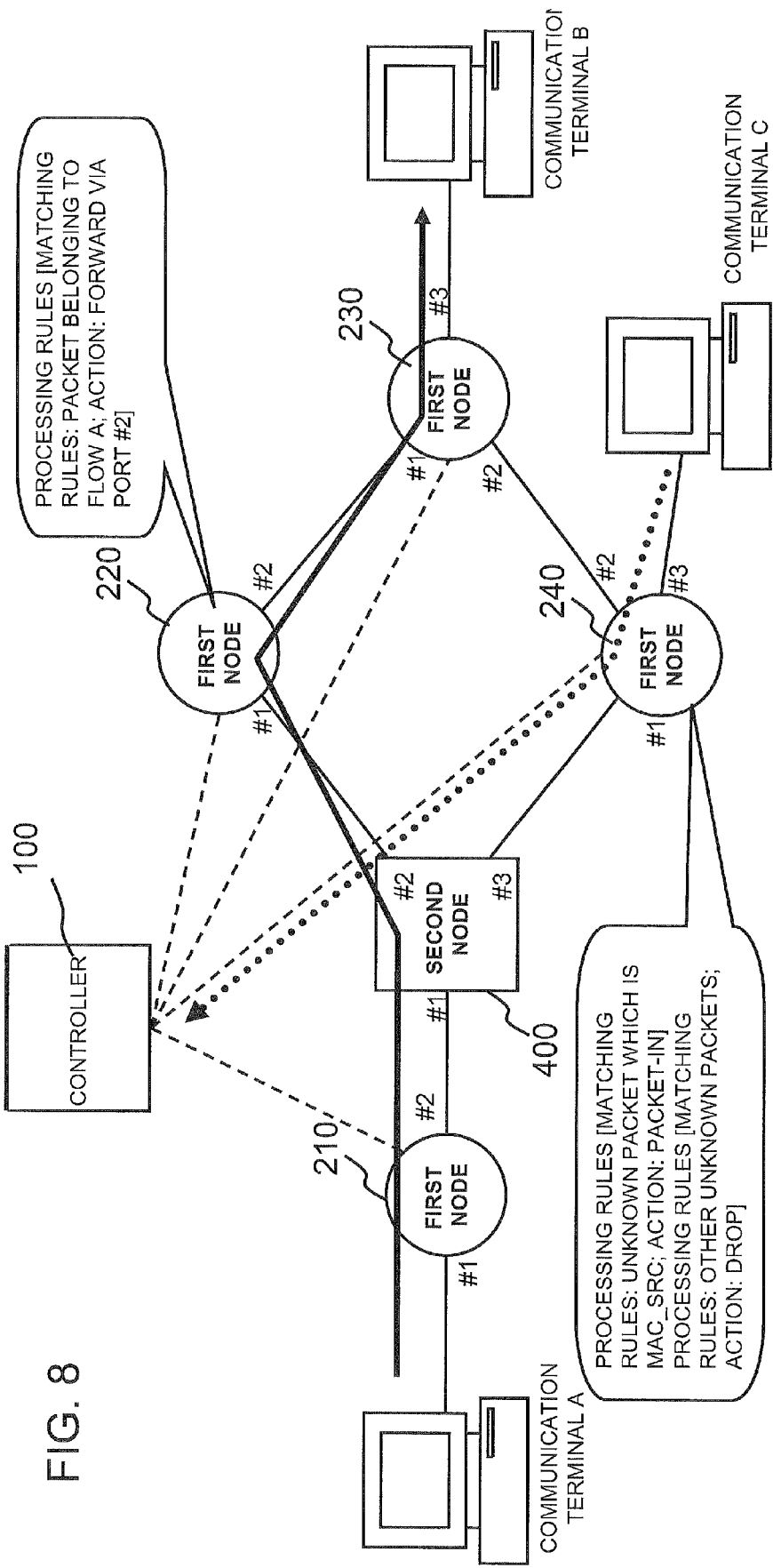
FIG. 8 is a schematic view for illustrating the operation of the exemplary embodiment 3 of the present invention.

As an alternative to setting the above mentioned processing rules, control shown in FIG. 8 may be exercised on reception of an unknown packet in which the information in e.g., a header field of a transmission source MAC address is of contents (C) allocated at the outset to a set of communication terminals inclusive of the communication terminal C. Such control may include allowing requesting the controller to set processing rules for the communication terminal set, viz., sending a new flow detection notification message (Packet-In), while causing the other unknown packets to be dropped.

Figure 9:
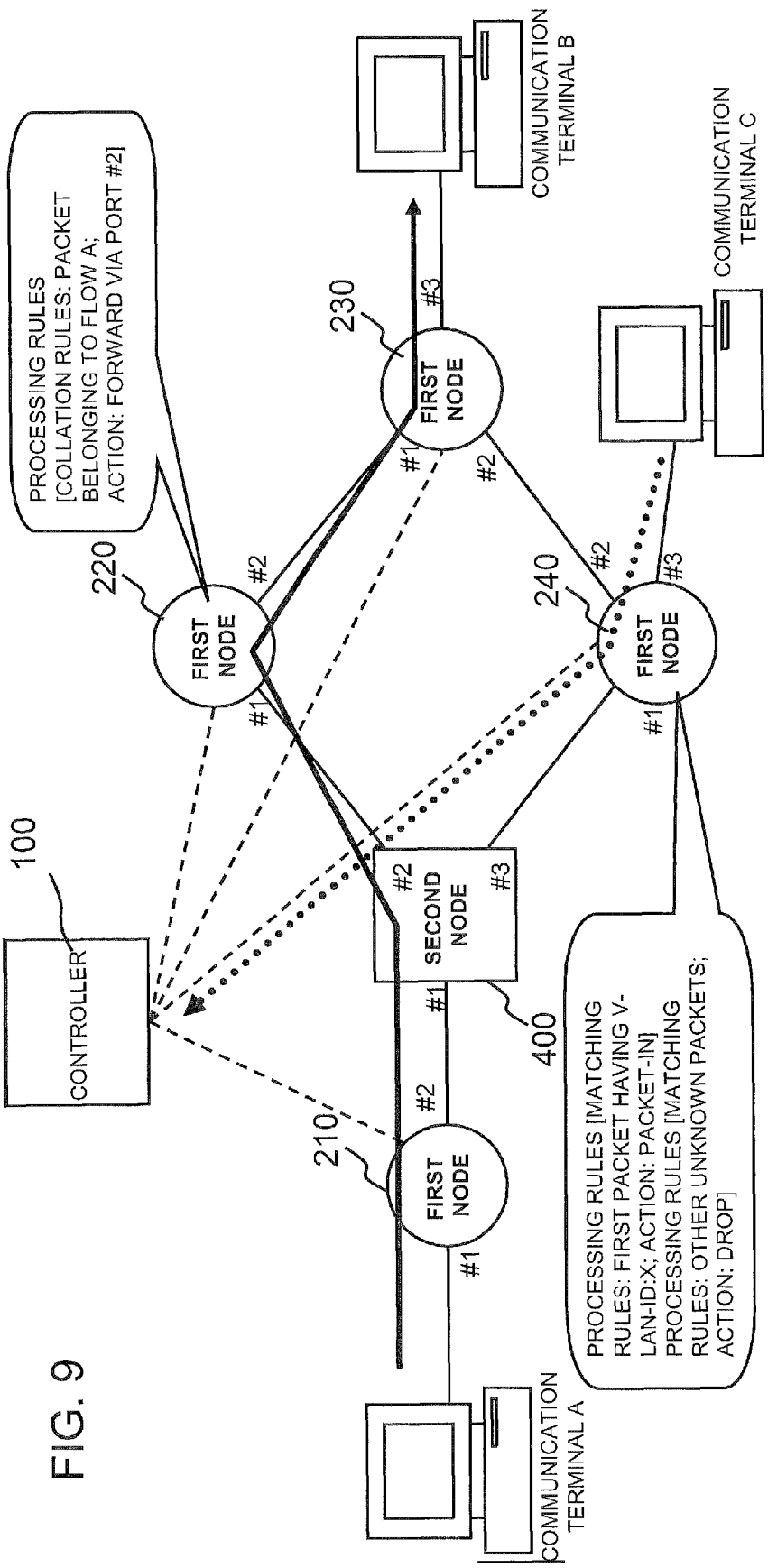
FIG. 9 is a schematic view for illustrating the operation of the exemplary embodiment 3 of the present invention.

Such control shown in FIG. 9 may also be exercised on reception of an unknown packet in which the transmission source MAC address is a VLAN-ID (=X) allocated at the outset to a set of communication terminals inclusive of the communication terminal C. Such control may include allowing requesting the controller to set processing rules, viz., sending a new flow detection notification message (Packet-In) to the controller, while causing dropping the other unknown packet.

Exemplary Embodiment 4

Figure 10:
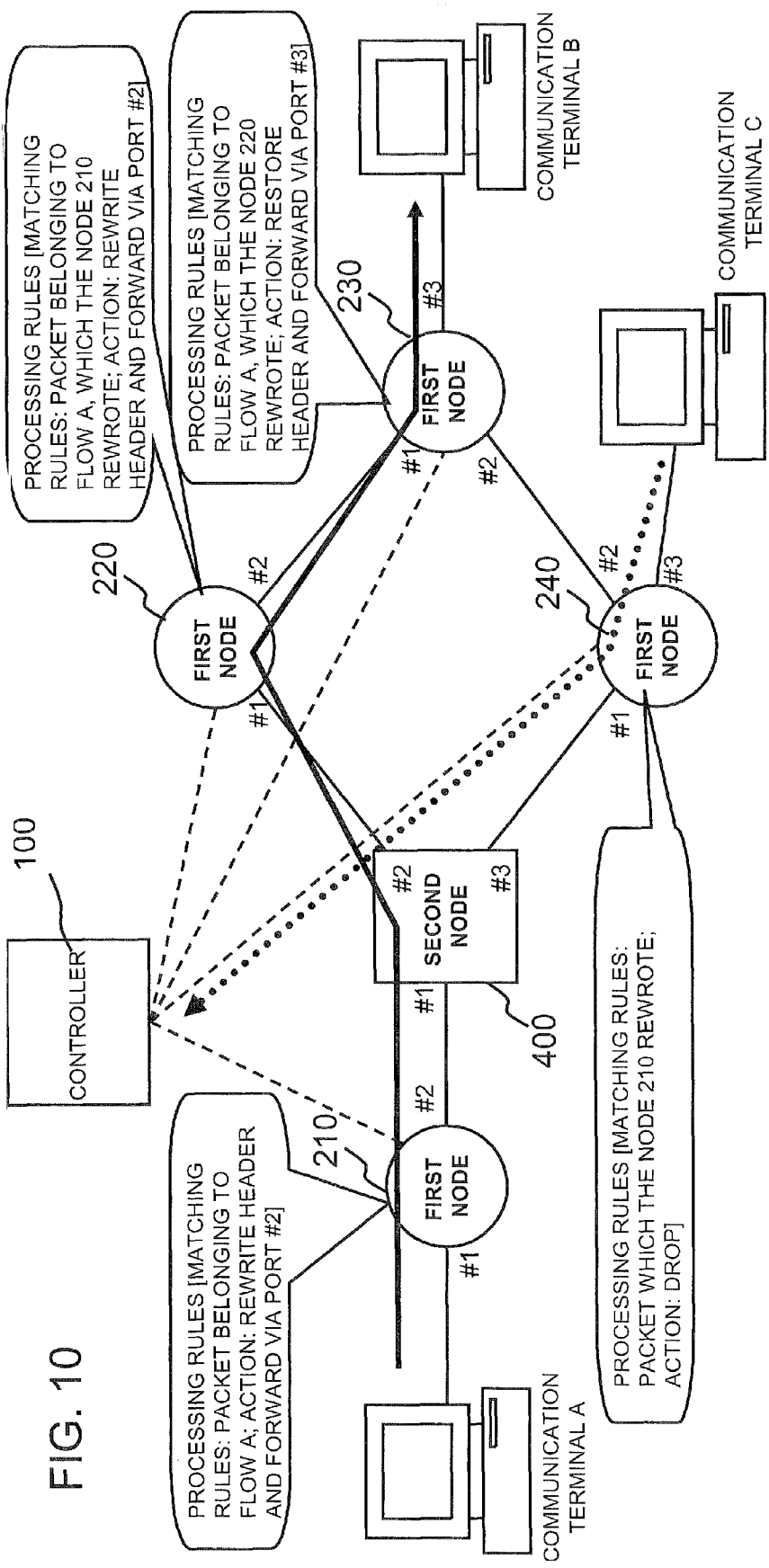
FIG. 10 is a schematic view for illustrating the operation of an exemplary embodiment 4 of the present invention.

An exemplary embodiment 4 of the present invention will now be described in detail with reference to the drawings. There may be such a case where, to manage sophisticated control or take the statistic information, such processing rules to the effect that, each time a packet is received, a packet received is forwarded after rewriting its header, are set in the first nodes 210 to 230, as shown in FIG. 10.

If, in such case, the processing rules having the same matching rules as those of the processing rules set in the first node 210 are set in the first node 240, such a situation may arise in which a packet that is sent from the second node 400, and that has its header already rewritten, is unable to be dropped.

Thus, in the subject exemplary embodiment, the controller 100 sets, in the first node 240 situated downstream of the second node 400, such processing rules which will cause the first node to drop the packet the header of which has been rewritten in the first node 210.

It should be noted that, in the subject exemplary embodiment, the packets captured by the processing rules, set in the first node 240, are restrictively the packets rewritten by the first node 210. Thus, on reception of an unknown packet from the communication terminal C, it is possible for the node to request the controller 100 to set processing rules for such packet, viz., send a new flow detection notification message (Packet-In) to the controller, without the necessity to set particular processing rules (see a broken line in FIG. 10).

Exemplary Embodiment 5

An exemplary embodiment 5 of the present invention will now be explained in detail with reference to the drawings. In the subject exemplary embodiment, as in the exemplary embodiment 1, it is presupposed that a packet addressed from the communication terminal A to the communication terminal B is forwarded through the first node 210, second node 400, first node 220 and the second node 230, in this order.

Figure 11:
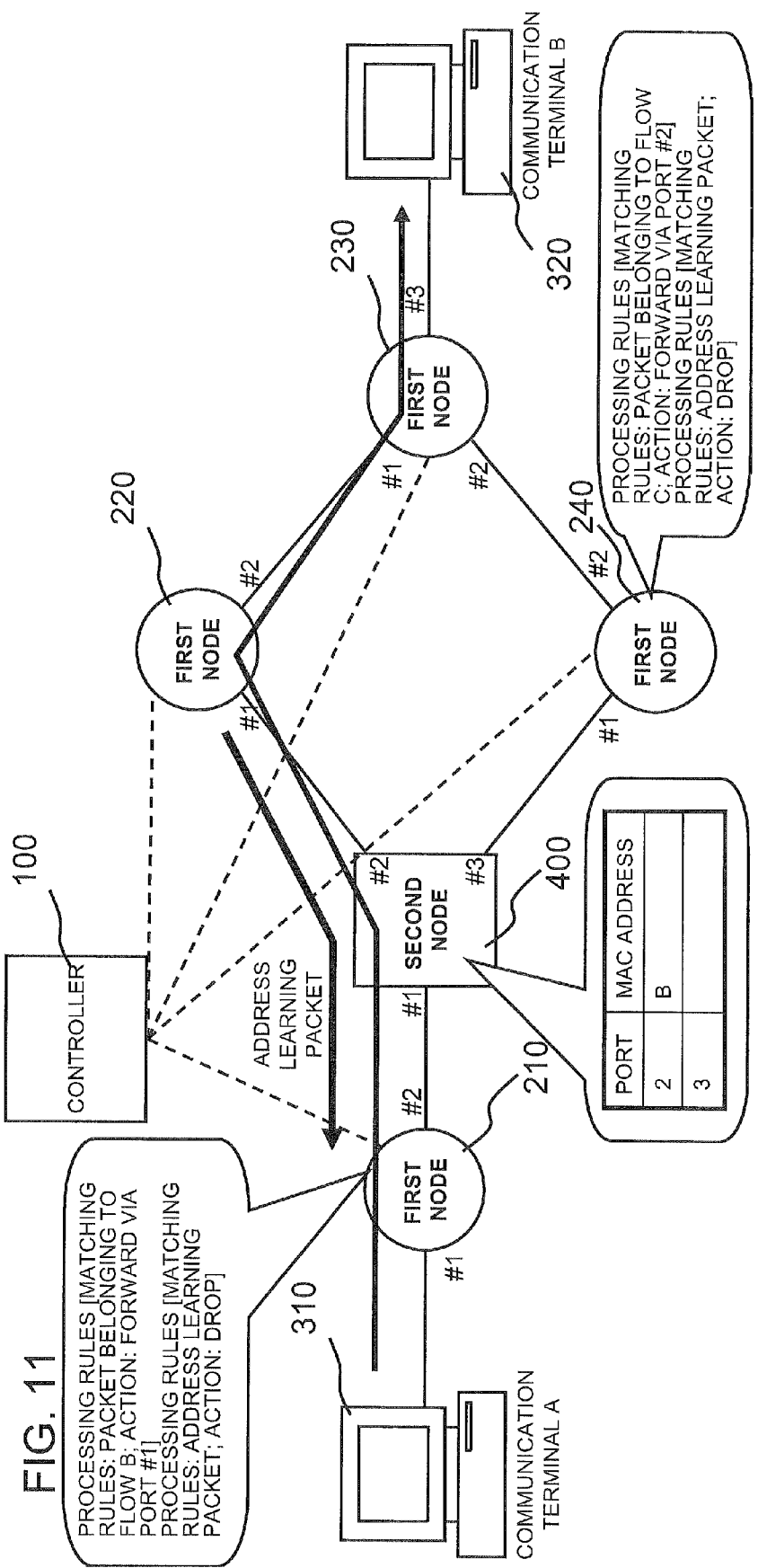
FIG. 11 is a schematic view for illustrating the operation of an exemplary embodiment 5 of the present invention.
Figure 13:
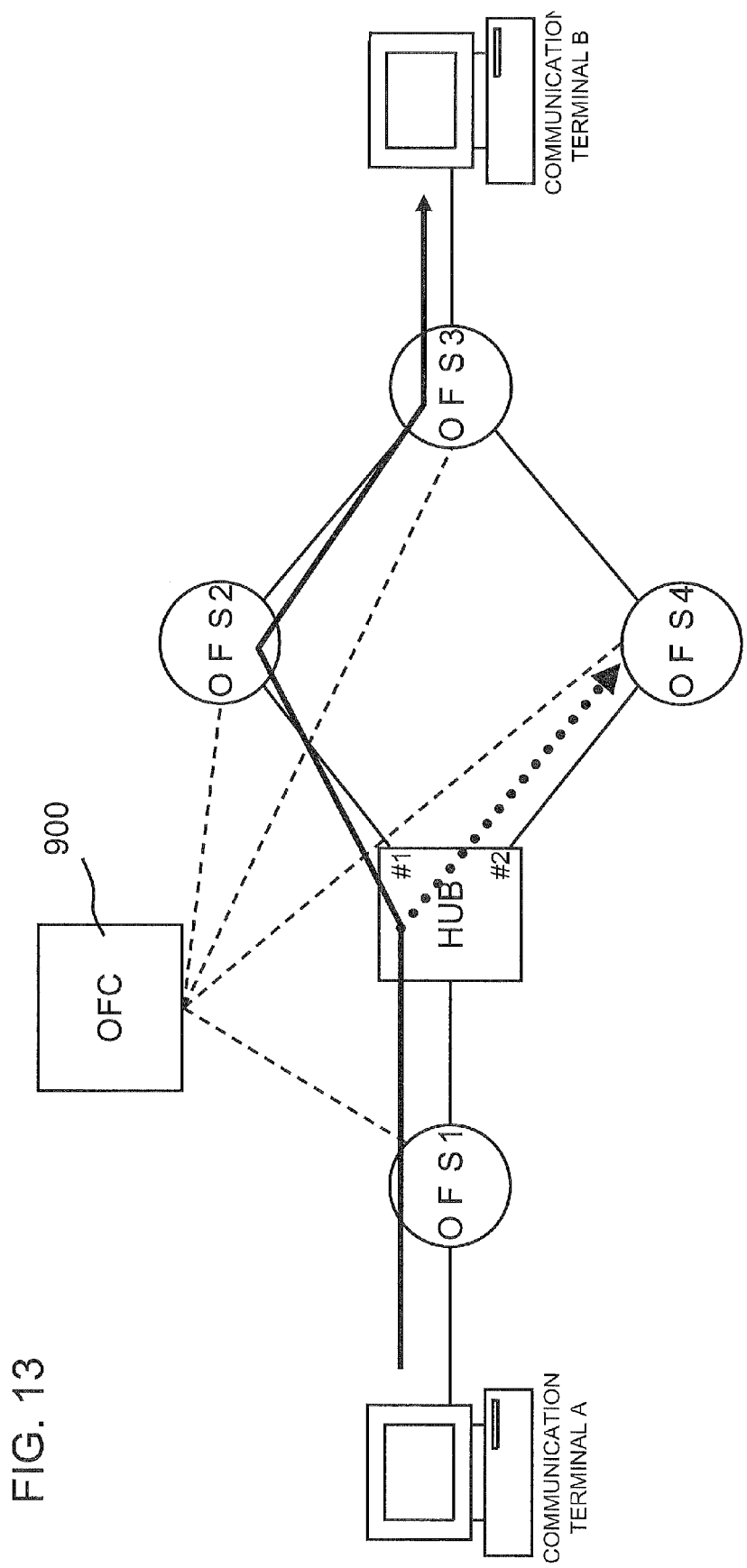
FIG. 13 is a schematic view for illustrating the flow of a packet in an environment where the OpenFlow switches shown in Non-Patent Literature co-exist with a legacy switch.

The second node 400 may be a Layer 2 switch forwarding a packet using a MAC address table, as shown in FIG. 11. In such case, to suppress a port move phenomenon as pointed out in Patent Literature 2, the controller 100 may transmit from the first node 220 to the second node 210 a dummy packet whose transmission source MAC address and destination MAC address are set at specific values (destination learning packet).

In such case, the destination learning packet may be dropped by setting processing rules to drop the packet in the first nodes 210 and 240.

It may occur that, in the second node 400, the flooding conditions hold good or entries learned on the MAC address table are erased by timeout. In such case, it is probable that the second node 400 transmits the packet from the communication terminal A to the communication terminal B to both the first node 220 and the first node 230.

Thus, in the subject exemplary embodiment, processing rules for dropping a packet addressed from the communication terminal A to the communication terminal B, viz., a packet belonging to the flow A, and those for dropping the destination learning address, are set in the first node 240 deviated from the packet forwarding path. Since there may be cases where the normal data packet flows in the same direction as that of the destination learning packet, it is preferred to set a rank of priority for dropping the destination learning packet in the processing rules so as to be lower than that for forwarding commonplace data.

It is thus possible to drop not only the packet addressed from the communication terminal A to the communication terminal B, viz., a packet belonging to the flow A, but also the other packet, herein a destination learning packet.

Although the description has been made of preferred exemplary embodiments of the present invention, such exemplary embodiments are not intended to limit the scope of the present invention, such that further modifications, substitutions or adjustments may be made without departing from the basic technical concept of the present invention. For example, simple numbers of the first and second nodes and the communication terminals, as well as the network configuration, shown in the above described exemplary embodiments, are intended to assist in the understanding of the present invention, such that it is also possible to use any of a variety of different configurations.

The particular exemplary embodiments or examples may be modified or adjusted within the gamut of the entire disclosure of the present invention, inclusive of claims, based on the fundamental technical concept of the invention. Moreover, a variety of combinations or selection of elements disclosed herein may be made within the framework of the claims. The present invention may cover a wide variety of modifications or corrections that may occur to those skilled in the art in accordance with the entire disclosure of the present invention, inclusive of claims and the technical concept of the present invention.

Preferred modes of the present invention may be summarized as follows:

[Mode 1]
(See the communication system according to the above mentioned first aspect)

[Mode 2]
The communication system according to mode 1, wherein, the control apparatus sets for the first node processing rules instructing dropping a packet not belonging to any flow.

[Mode 3]
The communication system according to mode 1 or 2, wherein,
on reception of a packet not belonging to any flows but satisfying pre-set conditions, processing rules are set for the first node that instruct the first node to notify the control apparatus of detection of a new flow.

[Mode 4]
The communication system according to any one of modes 1 to 3, wherein,
the pre-set conditions include the header information innate to a packet transmitted from a communication terminal coupled to the first node.

[Mode 5]

The communication system according to any one of modes 1 to 4, wherein, the control apparatus sets, for the first nodes situated on the forwarding path, processing rules to rewrite the header from one link to another;

the control apparatus setting, for the first node downstream of the second node, which is situated on the forwarding path, processing rules instructing dropping of a packet whose header has been rewritten in the first node situated upstream of the second node.

[Mode 6]

The communication system according to any one of modes 1 to 5, wherein, at least one of the second nodes is a Layer 2 switch;

the control apparatus causing the Layer 2 switch to receive an address learning packet flowing in a direction from the first nodes situated on the forwarding path downstream of the Layer 2 switch towards the Layer 2 switch; the address learning packet having a downstream side node as transmission source;

the control apparatus setting, for the first node receiving the address learning packet from the Layer 2 switch, processing rules instructing dropping the address learning packet.

[Mode 7]

(See the control apparatus according to the above mentioned second aspect)

[Mode 8]

The control apparatus according to mode 7, wherein, the control apparatus sets, for the first node, processing rules instructing the first node to drop a packet not belonging to any flows.

[Mode 9]

The control apparatus according to mode 7 or 8, wherein, on reception of a packet not belonging to any flows but satisfying pre-set conditions, processing rules are set for the first node that instruct the first node to notify the control apparatus of detection of a new flow.

[Mode 10]

The control apparatus according to any one of modes 7 to 9, wherein, the pre-set conditions include the header information innate to a packet transmitted from a communication terminal coupled to the first node.

[Mode 11]

The control apparatus according to any one of modes 7 to 10, wherein, processing rules are set for the first nodes situated on the forwarding path instructing the first nodes to rewrite the header from one link to another;

the control apparatus setting, for the first node lying downstream of the second node situated on the forwarding path, processing rules instructing dropping of a packet whose header has been rewritten in the first node situated upstream of the second node.

[Mode 12]

The control apparatus according to any one of modes 7 to 11, wherein, a Layer 2 switch is provided as the second node on the forwarding path;

the control apparatus causing the Layer 2 switch to receive an address learning packet, having a downstream side node as transmission source, from the first nodes situated on the forwarding path downstream of the Layer 2 switch towards the Layer 2 switch;

the control apparatus setting, for the first node receiving the address learning packet from the Layer 2 switch, processing rules instructing dropping of the address learning packet.

[Mode 13]

(See the path controlling method according to the above mentioned third aspect) [Mode 14]

(See the program according to the above mentioned fourth aspect)

REFERENCE SIGNS LIST

100, 100B, 100C, 100D, 900 controllers (control apparatuses apparatuss)
210~240 first nodes
400 second node
101 flow entry database (flow entry DB)
103 topology management unit
104 path/action calculation unit
105 flow entry management unit
106 control message processor
107 node communication unit

What is claimed is:

1. A communication system, comprising
   a plurality of first nodes that, in accordance with packet handling operations prescribing processing contents for a packet belonging to a pre-set flow, process a packet that is received and that matches to the packet handling operations;
   one or more second nodes that forwards the received packet via a plurality of ports thereof without referencing the packet handling operations; and
   a control apparatus that sets, for nodes of the first nodes that are situated on a forwarding path for the packet belonging to the pre-set flow, packet handling operations to forward the packet belonging to the pre-set flow to each next hop, the control apparatus further setting, for one of the first nodes that is not situated on the forwarding path, packet handling operations to cause dropping of the packet that has been forwarded from the one or more second nodes and that is off the forwarding path,
   wherein said one or more second nodes forwards the received packet via the plurality of ports without a control by the control apparatus.

2. The communication system according to claim 1, wherein, the control apparatus sets for said one of the first nodes the packet handling operations to drop a packet not belonging to any flows.

3. The communication system according to claim 1, wherein, the control apparatus sets, for said one of the first nodes, on reception of a packet not belonging to any flows but satisfying pre-set conditions, packet handling operations to cause said one of the first nodes to notify the control apparatus of detection of a new flow.

4. The communication system according to claim 1, wherein, the control apparatus sets, for the nodes of the first nodes that are situated on the forwarding path, packet handling operations to rewrite a header from one link to another,
   the control apparatus setting, for said one of the first nodes situated downstream of the one or more second nodes on the forwarding path, packet handling operations to cause dropping of a packet including a header rewritten in another one of the first nodes upstream of the one or more second nodes.

5. The communication system according to claim 1, wherein, at least one second node comprises a Layer 2 switch, wherein the control apparatus causing an address learning packet, including a downstream side node as a transmission source, to be received by the Layer 2 switch from said one of the first nodes situated downstream of the Layer 2 switch on the forwarding path, and wherein the control apparatus setting, in said one of the first nodes receiving the address learning packet from the Layer 2 switch, packet handling operations instructing dropping the address learning packet.

6. A control apparatus, connected to:
a plurality of first nodes that, in accordance with packet handling operations prescribing processing contents for a packet belonging to a pre-set flow, process a packet that is received and that matches to the packet handling operations; and to
one or more second nodes that forwards the received packet via a plurality of ports thereof without referencing the packet handling operations,
the control apparatus setting, for nodes of the first nodes that are situated on a path of forwarding a packet belonging to a pre-set flow, packet handling operations to forward the packet belonging to the pre-set flow to each next hop, the control apparatus setting, for one of the first nodes that is not situated on the forwarding path, handling operations instructing the node to drop the packet that is forwarded from said one or more second nodes and that is off the forwarding path,
wherein said one or more second nodes forwards the received packet via the plurality of ports without a control by the control apparatus.

7. The control apparatus according to claim 6, wherein, packet handling operations instructing dropping a packet not belonging to any flows are set in said one of the first nodes.

8. The control apparatus according to claim 6, wherein, if said one of the first nodes has received a packet not belonging to any flows but satisfying pre-set conditions, packet handling operations are set in said one of the first nodes to cause the node to notify the control apparatus of the detection of a new flow.

9. A path control method to be carried out by a control apparatus connected to:
a plurality of first nodes that, in accordance with packet handling operations prescribing processing contents for a packet belonging to a pre-set flow, process a packet that is received and that matches to the packet handling operations; and to
one or more second nodes that forwards the received packet via a plurality of ports thereof without referencing the packet handling operations, the method comprising:
setting, for nodes of the first nodes that are situated on a path of forwarding the packet belonging to the pre-set flow, packet handling operations that implement the forwarding path; and
setting, for one of the first nodes that is not situated on the path of forwarding the packet, packet handling operations that instruct dropping the packet that is off the forwarding path and that has been forwarded from said one or more second nodes,
wherein said one or more second nodes forwards the received packet via the plurality of ports without a control by the control apparatus.

10. The communication system according to claim 2, wherein, the control apparatus sets, for said one of the first nodes, on reception of a packet not belonging to any flows but satisfying pre-set conditions, packet handling operations to cause said one of the first nodes to notify the control apparatus of detection of a new flow.

11. The communication system according to claim 2, wherein, the control apparatus sets, for the nodes of the first nodes that are situated on the forwarding path, packet handling operations to rewrite a header from one link to another,
the control apparatus setting, for said one of the first nodes situated downstream of said one or more of the second nodes on the forwarding path, packet handling operations to cause dropping of a packet including a header rewritten in another one of the first nodes upstream of said one or more the second nodes.

12. The communication system according to claim 3, wherein, the control apparatus sets, for the nodes of the first nodes that are situated on the forwarding path, packet handling operations to rewrite a header from one link to another,
the control apparatus setting, for said one of the first nodes situated downstream of said one or more of the second nodes on the forwarding path, packet handling operations to cause dropping of a packet including a header rewritten in another one of the first nodes upstream of said one or more of the second nodes.

13. The communication system according to claim 2, wherein, at least one second node comprises a Layer 2 switch,
wherein the control apparatus causing an address learning packet, including a downstream side node as a transmission source, to be received by the Layer 2 switch from said one of the first nodes situated downstream of the Layer 2 switch on the forwarding path;
wherein the control apparatus setting, in said one of the first nodes receiving the address learning packet from the Layer 2 switch, packet handling operations instructing dropping the address learning packet.

14. The communication system according to claim 3, wherein, at least one second node comprises a Layer 2 switch,
wherein the control apparatus causing an address learning packet, including a downstream side node as a transmission source, to be received by the Layer 2 switch from said one of the first nodes situated downstream of the Layer 2 switch on the forwarding path, and
wherein the control apparatus setting, in said one of the first nodes receiving the address learning packet from the Layer 2 switch, packet handling operations instructing dropping the addressing learning packet.

15. The communication system according to claim 4, wherein, at least one second node comprises a Layer 2 switch,
wherein the control apparatus causing an address learning packet, including a downstream side node as a transmission source, to be received by the Layer 2 switch from said one of the first nodes situated downstream of the Layer 2 switch on the forwarding path, and
wherein the control apparatus setting, in said one of the first nodes receiving the address learning packet from the Layer 2 switch, packet handling operations instructing dropping the address learning packet.

16. The control apparatus according to claim 7, wherein, if said one of the first nodes has received a packet not belonging to any flows but satisfying pre-set conditions, packet handling operations are set in said one of the first nodes to cause the node to notify the control apparatus of the detection of a new flow.

17. The communication system according to claim 1, wherein said one of the first nodes that is not situated on the forwarding path is situated downstream of said one or more second nodes.

18. The communication system according to claim 1, wherein said one of the first nodes, which is not situated on the forwarding path, directly receives the packet that is forwarded from said one or more second nodes.

* * * * *